United States Patent
Salpekar et al.

(10) Patent No.: US 11,822,539 B1
(45) Date of Patent: Nov. 21, 2023

(54) SYSTEM AND METHOD FOR FACILITATING OPTIMIZATION OF FILE UPLOAD OPERATIONS VIA TRANSACTION TRANSFORMATION

(71) Applicant: Egnyte, Inc., Mountain View, CA (US)

(72) Inventors: Ajay Salpekar, Mountain View, CA (US); Sanjay Kulkarni, Mountain View, CA (US); Bhaskar Guthikonda, Mountain View, CA (US)

(73) Assignee: Egnyte, Inc., Mountain View, CA (US)

( * ) Notice: Subject to any disclaimer, the term of this patent is extended or adjusted under 35 U.S.C. 154(b) by 39 days.

(21) Appl. No.: 17/336,771

(22) Filed: Jun. 2, 2021

Related U.S. Application Data

(60) Provisional application No. 63/034,299, filed on Jun. 3, 2020.

(51) Int. Cl.
*G06F 16/23* (2019.01)
*G06F 16/21* (2019.01)
*H04L 67/568* (2022.01)

(52) U.S. Cl.
CPC ........ *G06F 16/2379* (2019.01); *G06F 16/219* (2019.01); *H04L 67/568* (2022.05)

(58) Field of Classification Search
CPC ... G06F 16/2379; G06F 16/219; H04L 67/568
See application file for complete search history.

(56) References Cited

U.S. PATENT DOCUMENTS

| | | | |
|---|---|---|---|
| 2010/0241458 A1* | 9/2010 | Hasan | G16H 50/20 705/3 |
| 2015/0163206 A1* | 6/2015 | McCarthy | H04L 63/104 726/4 |
| 2017/0041296 A1* | 2/2017 | Ford | G06F 21/64 |
| 2020/0153793 A1* | 5/2020 | Kikinis | H04L 63/101 |

* cited by examiner

*Primary Examiner* — Kris E Mackes
*Assistant Examiner* — Lin Lin M Htay
(74) *Attorney, Agent, or Firm* — FisherBroyles LLP; Kevin D. Jablonski

(57) ABSTRACT

A system for facilitating upload file optimization via transaction transformation. A request is received for an operation to upload a file to the cloud. The system bypasses a transaction processing (sub)system and attempts to upload the file to a staging area of the cloud. When the upload transaction is ready to be executed, the system determines an upload status of the file. The system transfers the file from the staging area to an intended destination if the file has been uploaded to the staging area. If the file is not yet uploaded to the staging area, the system determines if an upload operation failed. If an upload operation did not fail, the system waits for the upload to finish prior to transferring the file to the intended destination. If the upload operation did fail, the system uploads the file to the intended destination.

20 Claims, 2 Drawing Sheets

SYSTEM AND METHOD FOR FACILITATING OPTIMIZATION OF FILE UPLOAD OPERATIONS VIA TRANSACTION TRANSFORMATION

CROSS REFERENCE TO RELATED APPLICATION

This application claims the benefit of U.S. Provisional Application No. 63/034,299, titled "System And Method For Facilitating Upload File Optimization Via Transaction Transformation," filed Jun. 3, 2020, the disclosure of which is incorporated, in its entirety herein, by this reference.

FIELD OF THE DISCLOSURE

The present application relates to cloud technologies, data storage technologies, synchronization technologies, caching technologies, upload and download file optimization technologies, computing transaction transformation technologies, data consistency and integrity technologies, and more particularly, to a system and method for facilitating optimization of file upload operations via transaction transformation.

BACKGROUND

A hybrid cloud is a computing architecture that combines an on-premise data center with a public cloud environment. Hybrid cloud caches are local data storage elements used in conjunction with a public cloud-based data storage and serve as an important component of internet applications, as they help achieve improved throughput and increased data access speeds. Conventionally, such caches persist data and metadata regarding operations or transactions on a local file system. The integrity of data stored locally by a hybrid cloud cache may be increased by implementing a journaling system, where a system adds records representing user requested transactions and the associated operations to a journal. Thus, the journaling system may be a data storage location where records are added to represent operations initiated by a user or by a computing system at the direction of a user, and the backing store for a journal may comprise disk blocks. Journals may also be referred to as logs and the two terms are often used interchangeably.

When using a journal, user transactions and the associated operations are typically described using as little storage space as possible. At a high level, such operations may be classified into two types or categories of operations. The first type of operation may comprise data operations, which typically involve the local cache being used to upload data or files to, or download data or files from, the cloud system or platform. The second type of operation may comprise metadata operations, which typically involve the local cache being used to perform operations where data itself is not involved. For example, such metadata operations may include, but are not limited to, data or file rename and delete operations.

For practical reasons of local storage capacity, journals cannot grow indefinitely and typically must wrap-around, where this refers to a journaling system having the ability to overwrite old records without a system losing data or metadata. The ability to overwrite or wrap-around for a journal is dependent upon the operations described by the journal records having been completed and the associated data, file, or metadata having reached a final destination (such as a cloud-based platform), and so may be removed from the local hybrid cloud cache.

User initiated transactions often include (or result in) a mix of data and metadata operations. Data operations, which involve transfer of the actual data, typically take a longer time to complete than metadata operations. In some situations, each of the operations to be performed may be assigned monotonously increasing numbers referred to as transaction identifiers. In order to maintain consistency and ensure the integrity of the hybrid cloud cache, the transactions may be "pushed" to the cloud in the same order that they appear in the hybrid cloud cache, that is in the numerical order of the transaction identifiers. Transactions may also be marked PUSHDONE (i.e., completed) or identified in a similar manner in the local journal in the same order.

Due to this constraint, data operations such as uploading files (which can take a relatively long time to complete compared to other data operations or metadata operations), may result in an accumulation of transactions in the cache, slower system performance, and prevent or limit the ability to perform journal wrap-arounds and overwrites. This can be inefficient, as data operations may slow down completing the processing of transactions, leading to an accumulation of transactions waiting to be processed. This may be a particular problem with transactions involving the transfer of large files or other forms of data.

From the vantage point of a hybrid cloud cache, operations performed through it (i.e., using the local cache as a data storage to record a transaction or operation) are referred to as Explicit Transactions (or write-through transactions), while operations that are performed directly in the cloud, i.e., around or without use of the cache, are referred to as Implicit Transactions (or write-around transactions).

While current technologies and methodologies for using hybrid cloud computing architectures provide benefits and efficiencies, such technologies and methodologies still have disadvantages. One of these disadvantages is in maintaining proper synchronization between the contents of a persistent local cache and a cloud-based data storage, particularly when a system architecture incorporates a mixture of Explicit and Implicit transactions. Embodiments of the system, apparatuses, and methods described herein are directed to processes and techniques which assist in presenting a consistent view of a cached namespace while preserving its integrity, and in overcoming possible inefficiencies caused by the execution of operations involving data transfers between a local cache and a cloud storage element.

SUMMARY

The terms "invention," "the invention," "this invention," "the present invention," "the present disclosure," or "the disclosure" as used herein are intended to refer broadly to all of the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

As will be described, conventional methodologies and technologies used in managing a hybrid cloud computing architecture or other system that includes a hybrid cloud cache may be modified and/or enhanced by using an embodiment of the system, apparatuses, and methods described herein to provide a more optimized caching performance, along with enhanced data consistency and integrity. In some embodiments, this may include providing more effective handling of Explicit and Implicit transactions occurring in (through) and around (bypassing) a persistent local cache. Such enhancements and improvements to conventional methodologies and technologies may provide improved efficiency, improved data consistency, improved data integrity, improved speed, improved redundancy, improved long-term and short-term performance, reduced costs, and increased ease-of-use.

A system and accompanying methods for facilitating optimization of file upload operations via transaction transformation are disclosed. The system and methods overcome disadvantages associated with conventional approaches by performing early (i.e., in advance of when the upload operation would normally be performed by the transaction processing system) upload of files and effectively converting data operations into metadata operations. Further, the logic implemented by the system and methods allows the performance of the early uploading operations without compromising the hybrid cloud cache consistency or integrity.

In some embodiments, the system includes a processor or processors and a set of computer-executable instructions stored in a memory. When the processor or processors execute the set of instructions, the system performs a set of operations. The operations include receiving a request from a user (typically via a client device or process) to perform one or more operations. The requested operations may include data and metadata operations. The data operations may include file upload operations. Each requested operation is used to create a corresponding transaction for purposes of recording and tracking the operation in a journaling system of the hybrid cloud cache. Thus, there is a one-to-one mapping between a user requested operation and a corresponding transaction; in one sense, a user "sees" the request as an operation and the hybrid cloud cache "sees" it as a transaction.

In some embodiments, the system uses a hybrid cloud cache (or associated elements or processes) to generate two unique identifiers. The two identifiers are used to track each file uploaded by a client device or process and intended for storage in the cloud (i.e., on a cloud-based platform or destination). The first identifier may be utilized to identify the file itself and the second identifier may be utilized to identify a version of the file.

As mentioned, the system may associate each file upload operation with a corresponding transaction (referred to as an upload transaction) recorded in a journaling system of a hybrid cloud cache. In conventional systems, such upload transactions may be selected one at a time, "pushed" to the cloud, and marked PUSHDONE (as in completed) in a journal for consistency and integrity. However, in some embodiments, the system and methods described herein may utilize a different strategy.

In particular, in some embodiments, instead of uploading the files to the cloud sequentially by following the order of transactions (either as indicated by a numerical transaction identifier, a time stamp, etc.), the system may bypass the transaction processing system of the hybrid cloud cache and instead attempt to upload the file(s) (or a subset of the files designated for upload) concurrently to a staging area in the cloud (i.e., a dedicated data storage region of the cloud-based platform). The concurrent uploads may be implemented by establishing a set of connections between the hybrid cloud cache and the cloud platform, with each such connection providing a path for the upload of a file.

In some embodiments, the single upload or concurrent uploads may occur when the files are received from the client, and therefore prior to when the upload(s) would occur as part of the normal transaction processing sequence. In some embodiments, the staging area in the cloud may not be part of the namespace, and as a result, may not be visible or accessible to a client and/or user associated with the files. The system may maintain status information for all files being uploaded by utilizing the two unique identifiers, which may be stored in memory.

At a later time and when the transaction processing system of the hybrid cloud cache would normally be preparing to execute the upload transaction associated with a particular file or files, the system may execute logic that comprises one or more data processing steps or decisions and determines the upload status of the file(s) based on the unique identifiers. In response to determining the upload status, the system may perform one or more of the following actions or functions based on the described logic:

If the file (or files) has already been uploaded to the staging area of the cloud, then the system may move the file(s) from the staging area in the cloud to the destination of the file intended by the client or user (which may be defined by a path describing a location on the cloud platform);

Note that by doing so, the system converts the data operation associated with uploading the file(s) to a metadata operation, while maintaining the transactional integrity of the journal of the hybrid cloud cache;

i.e., the original data operation (a file upload) is converted to a metadata operation (a file transfer to a specific location, with the file metadata indicating the destination);

If an upload to the staging area has failed, then the system may upload the file(s) directly to the intended destination requested by the client;

If the file(s) has not yet been uploaded to the staging area, then the system may determine if an upload to the staging area has failed;

If an upload to the staging area has not failed, then the system may wait for the file(s) to be uploaded to the staging area and then move the file(s) out of the staging area in the cloud to the intended destination requested by the client; and If an upload to the staging area has failed, then the system may upload the file(s) directly to the intended destination requested by the client.

Regardless of the path executed, each of the three cases described results in the file being moved to the intended destination defined by the client. After this, the upload file transaction, which corresponds to a file upload data operation, may be marked as PUSHDONE (i.e., complete) in the journal of the hybrid cloud cache and the system may proceed to the next transaction and its associated operation. This has the benefit of saving the time that would otherwise be consumed by uploading the file as part of a conventional transaction processing sequence.

Once the upload file transaction (corresponding to the file upload data operation) is marked complete (PUSHDONE) in the journal of the hybrid cloud cache, the system may stop tracking the status of the file associated with the upload transaction. As a result, the system facilitates faster execution of uploads and the associated transactions by pre-uploading files and in effect transforming data operations into metadata operations. Further, this is accomplished without compromising the consistency and integrity provided by the cache journaling system. These benefits result in part from leveraging the cloud's (i.e., the cloud-based platform or system's) capability to handle multiple connections (and hence multiple streams of data) concurrently.

In another embodiment, a method for facilitating the optimization of file upload operations via transaction transformation is provided. The method may be performed by a system, server, device, or platform that includes a processor or processors that have been programmed with a set of computer-executable instructions, where the instructions may be stored in a memory. The method may include receiving a request to initiate or execute a data operation involving the upload of a file to a cloud system or platform. The method may include associating the requested data operation with a corresponding transaction (referred to as an upload transaction) in a journal of a hybrid cloud cache. The method may further include bypassing a transaction processing system of the hybrid cloud cache and instead attempting to upload the file directly to a staging area of the cloud platform. In some embodiments, this may occur using a set of concurrent uploads.

Additionally, the method may execute logic to determine a status of the file when the transaction processing system is ready to execute the upload transaction as part of its normal transaction processing sequence. If the status (referred to as the upload status) indicates that the file has already been uploaded to the staging area of the cloud, then the method may cause the file to be transferred from the staging area to a destination intended by the client/user, which may be defined by a path (such as a folder or file stored in the cloud). This has the effect of causing what was originally a data operation (a file upload) to be converted into a metadata operation (a file transfer to a specific location, with the file metadata indicating the destination).

If the upload status indicates that the file has not been uploaded to the staging area, then the logic may determine if an attempted upload to the staging area has failed. If not, then the method may wait for the upload to the staging area to finish before returning control to the decision which determines if the file has been uploaded to the staging area. As before, once the upload to the staging area has been completed, the process may transfer the file to the destination intended by the client. After the file has been transferred from the staging area in the cloud to the destination intended by the client, the method may mark the upload transaction associated with the file upload operation as complete (PUSHDONE) in the cache journal.

If the logic determines that an attempted upload to the staging area has failed, then the method may upload the file directly to the intended destination, followed by marking the upload transaction associated with the file upload operation as complete (PUSHDONE) in the cache journal.

Regardless of the path executed, each of the three cases described results in the file being moved to the intended destination defined by the client. After this, the upload file transaction, which corresponds to a file upload data operation, may be marked as PUSHDONE (i.e., complete) in the journal of the hybrid cloud cache and the system may proceed to the next transaction and its associated operation.

Once the upload file transaction (corresponding to the file upload data operation) is marked complete (PUSHDONE) in the journal of the hybrid cloud cache, the system may stop tracking the status of the file associated with the upload transaction. As a result, the system facilitates faster execution of uploads and the associated transactions by pre-uploading files and in effect transforming data operations into metadata operations. Further, this is accomplished without compromising the consistency and integrity provided by the cache journaling system. These benefits result in part from leveraging the cloud's (i.e., the cloud-based platform or system's) capability to handle multiple connections (and hence multiple streams of data) concurrently.

According to yet another embodiment, a set of computer-executable instructions for facilitating the optimization of file upload operations via transaction transformation is provided. The computer instructions, when executed by a processor or processors, may cause the processor or processors (or a device, system, or server in which the processor or processors are contained) to perform one or more operations including:

receiving, from a client device or process, a request to initiate or execute a data operation involving the upload of a file to a cloud platform or system;

associating the requested data operation with a corresponding transaction (referred to as an upload transaction) in a journal of a hybrid cloud cache;

bypassing a transaction processing system of the hybrid cloud cache and instead attempting to upload the file directly to a staging area of the cloud platform;

note that this is done in advance of when the transaction associated with the file upload operation would typically be executed by the cache transaction processing system as part of the normal sequence of executing transactions;

executing logic to determine a status of the file when the transaction processing system is ready to execute the upload transaction as part of its normal transaction processing sequence:

If the status (referred to as the upload status) indicates that the file has already been uploaded to the staging area of the cloud, then the instructions may cause the file to be transferred from the staging area to a destination intended by the client/user, which may be defined by a path (such as a folder or file stored in the cloud);

This has the effect of causing what was originally a data operation (a file upload) to be converted into a metadata operation (a file transfer to a specific location, with the file metadata indicating the destination);

If an upload to the staging area has failed, then the instructions may cause the processor or processors to upload the file(s) directly to the intended destination requested by the client;

If the file(s) has not yet been uploaded to the staging area, then the system may determine if an upload to the staging area has failed;

If an upload to the staging area has not failed, then the system may wait for the file(s) to be uploaded to the staging area and then move the file(s) out of the staging area in the cloud to the intended destination requested by the client; and If an upload to the staging area has failed, then the system may upload the file(s) directly to the intended destination requested by the client.

Regardless of the path executed, each of the three cases described results in the file being moved to the intended destination defined by the client. After this, the upload file transaction, which corresponds to a file upload data operation, may be marked as PUSHDONE (i.e., complete) in the journal of the hybrid cloud cache and the system may proceed to the next transaction and its associated operation.

Once the upload file transaction (corresponding to the file upload data operation) is marked complete (PUSHDONE) in the journal of the hybrid cloud cache, the system may stop tracking the status of the file associated with the upload transaction. As a result, the system facilitates faster execution of uploads and the associated transactions by pre-uploading files and in effect transforming data operations into metadata operations. Further, this is accomplished without compromising the consistency and integrity provided by the cache journaling system. These benefits result in part from leveraging the cloud's (i.e., the cloud-based platform or system's) capability to handle multiple connections (and hence multiple streams of data) concurrently.

These and other features of the systems and methods for facilitating the optimization of file upload operations via transaction transformation are described in the following detailed description, drawings, and appended claims. Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the system and methods in accordance with the present disclosure will be described with reference to the drawings, in which.

DETAILED DESCRIPTION

Figure 1:
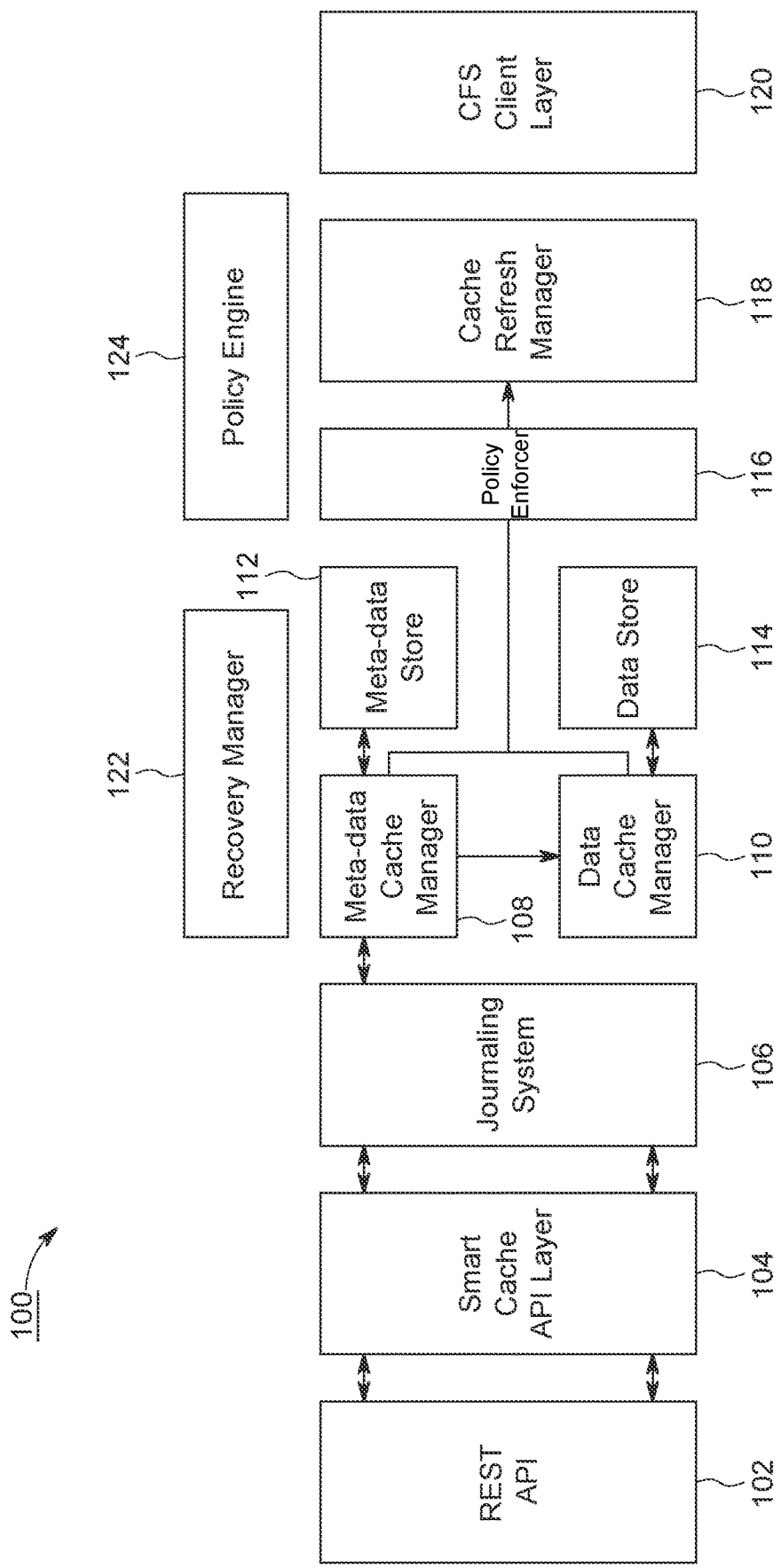
FIG. 1 is a schematic diagram illustrating a system including components for facilitating optimization of file upload operations via transaction transformation, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

A system and accompanying methods for facilitating the optimization of file upload operations via transaction transformation are disclosed. In some embodiments, the system and methods address potential problems associated with conventional approaches by facilitating early (i.e., in advance of when the upload operation would be expected to be performed by the transaction processing system) upload of files and converting data operations into metadata operations. In some embodiments, the system and methods involve generating two unique identifiers to track each file uploaded by a client and intended for storage in the cloud. The first identifier may be used to identify the file itself and the second identifier may be used to identify the version of the file. The system and methods may associate each file upload operation with a corresponding upload transaction in a cache journal.

In some embodiments, instead of uploading the file(s) to the cloud in an order determined by a corresponding upload transaction identifier used by the hybrid cloud cache transaction processing subsystem (such as a sequence of increasing numbers), the system and methods may bypass the transaction processing system and attempt to upload the files (i.e., as a single file or as a group concurrently over multiple connections to the cloud platform) to a staging area in the cloud. The system and methods may operate to maintain status information for files being uploaded by utilizing the two unique identifiers (one for a file and one for a version of the file), which may be stored in memory.

Once the transaction processing system of the hybrid cloud cache is ready to execute the upload transaction associated with a particular file, the system and methods may check the upload status of the file by examining the unique identifiers of the file. Based on the examination, the system and methods may perform one or more of the following operations or actions:

- if the file has already been uploaded to the staging area of the cloud, then the system and methods may move the file from the staging area in the cloud to the destination the client intended or requested for the file (as identified by a path or URL, for example);
  - by doing so, the system and methods convert the data operation associated with uploading the file to a metadata operation (recording the location of the file as part of the file metadata), while maintaining the transactional integrity in the journal of the hybrid cloud cache;
- If an upload to the staging area has failed, then the system may upload the file(s) to the intended destination requested by the client;
- If the file(s) has not yet been uploaded to the staging area, then the system may determine if an upload to the staging area has failed;
  - If an upload to the staging area has not failed, then the system may wait for the file(s) to be uploaded to the staging area and then move the file(s) out of the staging area in the cloud to the intended destination requested by the client; and
  - If an upload to the staging area has failed, then the system may upload the file(s) to the intended destination requested by the client;
- the upload file transaction, which is a data operation, may be marked as complete (PUSHDONE) in the journal of the hybrid cloud cache and the system and methods may proceed to the next operation, thereby saving the time that would otherwise be used for the uploading operation;
  - once the data operation is marked complete in the journal of the hybrid cloud cache, the system and methods may stop tracking the status of the file associated with the upload/data transaction.

Thus, the system and methods described herein facilitate faster uploads by transforming data operations into metadata operations without compromising the consistency and integrity provided by the journaling system and by leveraging the cloud's capability to handle multiple streams of connections concurrently.

FIG. 1 is a schematic diagram illustrating a system 100 including components for facilitating optimization of file upload operations via transaction transformation, in accordance with some embodiments. In particular, the system and methods incorporate and provide techniques that perform file upload optimization by uploading files to a staging area in advance of when they would be uploaded by execution of a transaction by the cache transaction processing subsystem. Further, the system executes logic that determines a status of a file upload to the staging area and performs operations to ensure the consistency of the journaling system of the hybrid cloud cache.

The system 100 may be configured to support, but is not limited to supporting, caching services, hybrid cloud services, cloud services, transaction system services, content delivery services, monitoring services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and other computing applications and services.

In some embodiments, the system 100 may be included within another system, may be a separate system from another system, and/or may be a subsystem of another system. System 100 may be implemented, at least in part, as a set of computer-executable instructions that when executed by a suitably programmed processor, cause the processor or a server or device of which the processor is a part, to perform one or more of the methods, functions, operations, or processes described herein.

The system 100 may include, but is not limited to including, a REST Application Programming Interface (API) 102 (or other API), a smart cache API layer 104 (or other API layer), a journaling system 106 (which may include any number of journals), a metadata cache manager 108, a data cache manager 110, a metadata store 112, a data store 114, a policy enforcer 116, a cache refresh manager 118, a cloud-file-storage (CFS) client layer 120, a recovery manager 122, and a policy engine 124. The system 100 may include a hybrid cloud cache that may utilize the various components of the system 100 and may communicatively link and upload data to and/or download data from a cloud system. The REST API 102 may serve as the interface between user devices and/or other devices and applications supporting the functionality of the system 100. The REST API 102 may be configured to receive API calls from clients (e.g., to access a cache and/or to perform other functions), such as from user devices. The smart cache API layer 104 may serve as an intermediary between the REST API 102 and the journaling system 106 and the other components of the system 100, such as, but not limited to, the cloud-file-storage system and/or other components or applications of the system 100.

The journaling system 106 may include one or more journals. One or more of the journals may be configured to record transactions associated with operations requested by a user (including, for example, data and metadata associated with the operations). The metadata may be information that describes the data and/or operations, what is in the data, and/or the type of operation. In some embodiments, the journals may be a circular log, buffer, and/or other data structure. In some embodiments, the journals may transfer records containing information associated with the operations to the cloud, such as to a cloud-based platform or system. Once the records are transferred to the cloud, the records may be deleted from (or overwritten in) the journal(s). The journal(s) may be utilized to ensure that the operations requested by users/clients are carried out and performed, even if the system 100 crashes or suffers another type of interruption. Data and metadata associated with the operations may be managed by the data cache manager 110 and the metadata cache manager 108, respectively. In some embodiments, the records including the data and metadata may be stored in the data store 114 and the metadata store 112, respectively.

The system 100 may include a policy enforcer 116, which may be configured to enforce the policies and rules associated with the system 100. The cache refresh manager 118 may be configured to refresh any cache in the system 100. For example, the cache refresh manager 118 may be configured to ensure that data and/or metadata recently stored in a particular cache is current and/or accurate. The system 100 may also include a cloud-file-storage system client layer 120, which may be utilized to facilitate the providing of the records associated with the operations from the journal(s) to a cloud-file-storage system (e.g., the cloud system). Additionally, the system 100 may include a recovery manager 122, which may be configured to recover lost data and/or metadata and ensure that the integrity of the data in the journals and/or caches of the system 100 is preserved. The system 100 may further include a policy engine 124, which may be configured to generate and/or conduct various operations associated with policies and/or rules to be utilized with the system 100.

With regards to policy engine 124, examples of policies that may be implemented by the engine include but are not limited to, or required to include the following:
 a) Storage Management policies (e.g., how much disk space should be used by the cache);
 b) Caching policies—what should be cached, what part of cache should be updated and when; and
 c) Eviction policies—What should be evicted/removed from cache if there is a need to do so.
In some embodiments, one or more policies may be implemented in whole or in part by a rule-base, a trained machine learning model, or other decision process.

As an example, the system 100 may operate in the following manner. The hybrid cloud cache of the system 100 may generate two unique identifiers to track each file (or data set) uploaded by a user into the system 100 and/or to the local hybrid cloud cache. The first unique identifier may identify the file (or data set) itself and the second unique identifier may identify the version of the file (or data set). In some embodiments, each file upload operation initiated or caused to occur by a user may also be associated with a transaction (which may be referred to as an "upload transaction"). In a typical scenario, the system 100 may select each such transaction one at a time (and in the order of an assigned transaction identifier, which may be a sequence of numbers), "push" the file or data set that is to be uploaded to the cloud, and mark the transaction as PUSHDONE (i.e., completed) in the journal of the hybrid cloud cache.

In general, the cache journaling system writes PUSH-DONE records in sequential order. As an example, the PUSHDONE for transaction Tn will typically not be written until the PUSHDONE for Tn−1 has been written, even if Tn is pushed to the cloud before Tn−1. The journaling system typically operates in this way because writing in sequential order reduces the complexity associated with other aspects of the journaling system, such as replay and reservation management.

However, as an alternative to the described approach, the system 100 may address disadvantages associated with the conventional approach by enabling the early (i.e., in advance of when the upload operation would be expected to be performed by the transaction processing system) upload of files and in effect convert the data operations associated with uploading the files into metadata operations, while also implementing logic to ensure that the consistency and integrity of the cache and its journaling system are not compromised.

In an example use-case, the system 100 may receive a request from a client device (or process) associated with a user to perform a data operation that involves uploading a file, such as a media content file, to an intended destination, such as a location on the cloud platform. The system 100 may associate the data operation with a transaction (referred to as an upload transaction herein) in a journal of a hybrid cloud cache of the system 100.

In some embodiments, instead of uploading the file to the cloud platform by executing an upload transaction in the order in which it was recorded in a cache journal (as indicated by its transaction identifier), the system 100 may bypass the transaction processing subsystem of the hybrid cloud cache and upload the file(s) to a staging area in the cloud. This may be done when the file(s) are received from the client, and prior to when the file(s) would be uploaded by the transaction processing system as part of its normal operation (i.e., transactions being executed in a sequence determined by the order of their transaction identifiers). In some embodiments, the system 100 may maintain status information for the file via two unique identifiers, where the first identifier may identify the actual file itself and the second identifier may identify the version of the file.

Additionally, in some embodiments, one or both identifiers may be associated with metadata associated with the file. Such metadata may include an indication of the upload status of the file. The upload status information may indicate whether the file has been uploaded to the staging area in the cloud or whether an upload to the staging area has failed. In some embodiments, the metadata may include an identification of the type of file, a size of the file, an intended destination for the file, a source of the file, an identification of the sender of the file, or a combination thereof.

At a later time, and in some cases, after the file has been uploaded to the staging area in the cloud, the transaction processing system of the hybrid cloud cache may be ready to execute the upload transaction associated with the data operation for uploading the file. At this time, the system 100 may determine the status of the file with regards to it being uploaded by examining the unique identifiers and/or the accompanying metadata.

In some embodiments, if the status indicates that the file has already been uploaded to the staging area of the cloud, then the system 100 may initiate transfer of the file from the staging area in the cloud to the destination intended by the user, such as a specific location in the cloud. This action performed by the system 100 operates to convert the data operation of a file upload to a metadata operation, while maintaining transaction integrity. As an example, the system 100 may transform the data operation into a metadata operation, such as to a rename operation. In some embodiments, the rename operation may include renaming the name of the file from the name based on the unique identifier(s) to the actual name provided by the user.

If the status indicates that the file(s) has not yet been uploaded to the staging area, then the system may determine if an upload to the staging area has failed. If an upload to the staging area has not failed, then the system may wait for the file(s) to be uploaded to the staging area and then move the file(s) out of the staging area in the cloud to the intended destination requested by the client. If an upload to the staging area has failed, then the system may upload the file(s) to the intended destination requested by the client.

The upload file transaction, which is a data operation, may be marked as complete (PUSHDONE) in the journal of the hybrid cloud cache and the system and methods may proceed to the next operation, thereby saving the time that would otherwise be used for the uploading operation. Once the data operation is marked complete in the journal of the hybrid cloud cache, the system and methods may stop tracking the status of the file associated with the upload/data transaction.

Thus, the system and methods described herein facilitate faster uploads by transforming data operations into metadata operations without compromising the consistency and integrity provided by the journaling system and by leveraging the cloud's capability to handle multiple streams of connections concurrently.

This approach and processing flow saves the time that would otherwise be used to upload the file from the hybrid cloud cache to the intended destination in the cloud during execution of its corresponding transaction. As mentioned, once the data operation is marked complete (PUSHDONE) in the journal, the system 100 may cease tracking of the status of the file. In some embodiments, implementation of the functionality of the system 100 as described herein resulted in 30-40% better performance with multiple simultaneous uploads for the same data set and the same set of operations.

Figure 2:
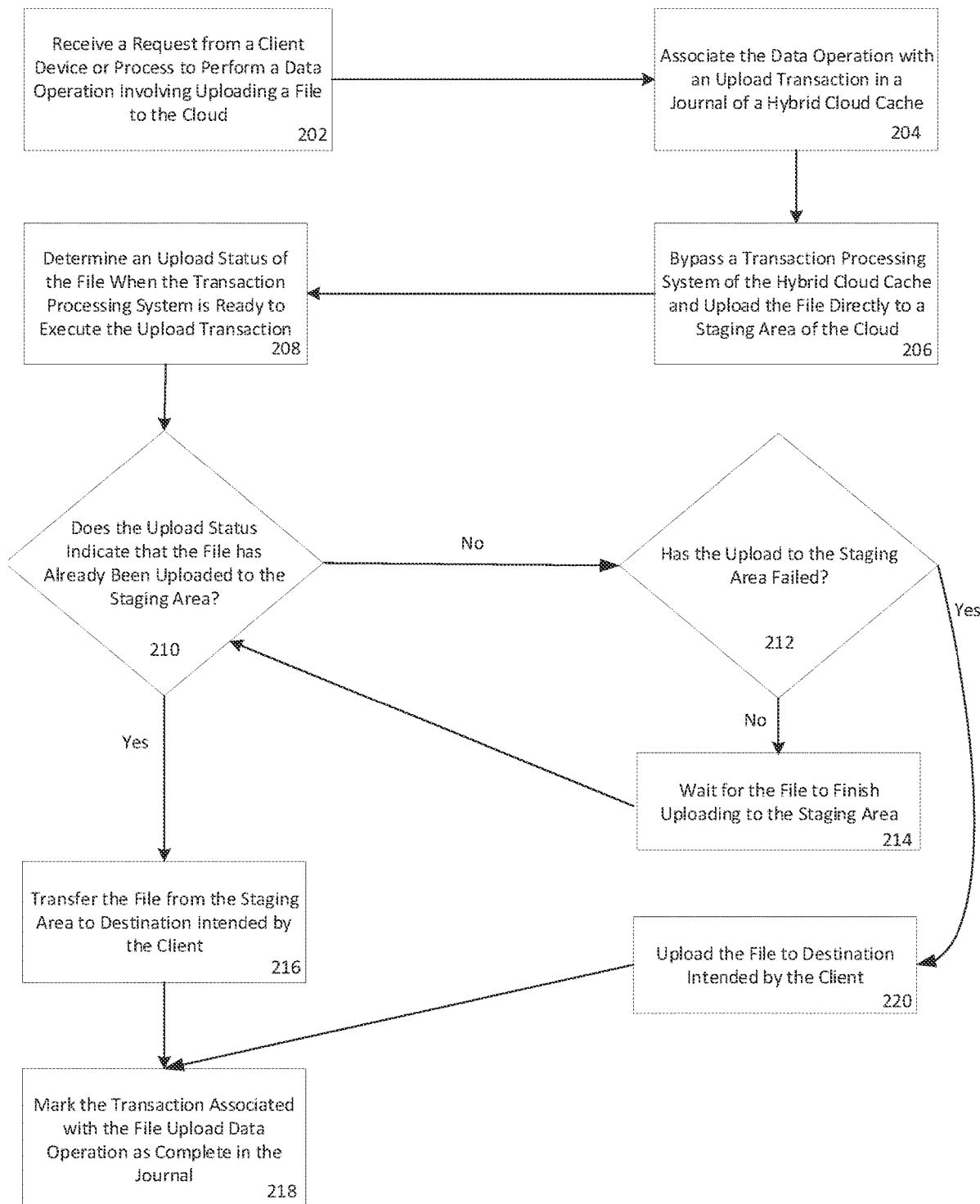
FIG. 2 is a flow chart or flow diagram illustrating an example process, operation, method, or function for facilitating the optimization of file upload operations via transaction transformation, in accordance with some embodiments.

FIG. 2 is flow chart or flow diagram illustrating an example process, operation, method, or function 200 for facilitating the optimization of file upload operations via transaction transformation, in accordance with some embodiments. As an example, the method 200 may proceed as follows:

At step 202, the method 200 may include receiving a request from a client device or process to perform a data operation involving uploading a file or files to the cloud;

At step 204, the method 200 may include associating the requested data operation with a transaction (referred to as an upload transaction) in a journal of a hybrid cloud cache;

At step 206, the method 200 may include bypassing a transaction processing system of the hybrid cloud cache and instead attempting to upload the file or files associated with the data operation directly to a staging area of the cloud platform;

In some embodiments, the upload operation to the staging area is performed by a separate processing thread from the transaction processing. In such embodiments, the upload thread notifies the transaction processing thread when the upload operation is finished;

At step 208, the method 200 may include determining an upload status of the file or files when the transaction processing system is ready to execute the corresponding upload transaction as part of the normal sequence of transaction processing;

In some embodiments, the upload status may be determined by examining metadata associated with the transaction;

In some embodiments, the upload status may be determined by use of file and/or version identifiers associated with the transaction;

In some embodiments, the upload status may indicate whether the file has been uploaded to the staging area or if an upload operation to the staging area has failed;

At step 210, the method 200 may include determining if the upload status indicates that the file has already been uploaded to the staging area of the cloud;

If so (corresponding to the "Yes" branch of step 210), then the method 200 may proceed to step 216, which may include causing the file to be transferred from the staging area to the destination intended by the client (which may be defined by a path describing a location on the cloud platform);

If at step 210 the upload status does not indicate that the file has already been uploaded to the staging area in the cloud (corresponding to the "No" branch of step 210), then the method 200 may proceed to step 212;

At step 212 the method may determine whether the upload status (or another item of data or metadata) indicates that the upload operation to the staging area has failed;

If the upload to the staging area has not failed (corresponding to the "No" branch of step 212), then the method may wait for the file to finish being uploaded to the staging area of the cloud (as suggested by step or stage 214);

After the upload to the staging area has completed, control passes to step or stage 210 as described previously. As described previously, if at step 210, the upload status indicates that the file has already been uploaded (i.e., finished uploading) to the staging cloud area of the cloud, then the method 200 may proceed to step 216. At step 216, the method 200 may include causing the file to be transferred from the staging area of the cloud to a destination intended by the client, such as a folder in the cloud;

If at step or stage 212 it is determined that the upload operation to the staging area has failed (corresponding to the "Yes" branch of 212), then the method may proceed to step or stage 220 where the file is uploaded directly to the intended destination;

After the processing reaches step 216 or 220, it may proceed to step 218, where after the file has been transferred from the staging area to the intended destination, the method 200 may include marking the transaction associated with the file upload operation as complete (PUSHDONE) in the cache journal.

Note that the method and corresponding processing flow 200 may continue to operate as additional requests for operations are received and the corresponding transactions processed by the system 200. The method 200 may further incorporate any of the features and functionality described for the system 100, any other method disclosed herein, or as otherwise described herein.

The following describes an example of an implementation of the processing flow described herein:

A user connected to a hybrid cloud cache performs operations. Among these user operations, there are 4 upload file operations to the hybrid cloud cache represented as UO1, UO2 . . . UO4. Each of these user operations will have a corresponding transaction created by the journaling system in the Hybrid Cloud Cache. Assume that the 4 upload file operations (UO1 . . . UO4) are represented as T1 . . . T4 in the transactions;

These are Explicit transactions, where T1 is the oldest and Tn is the youngest transaction. The notation Tn−1<Tn means Tn−1 is older than Tn. For each of the files uploaded, Hybrid Cloud Cache generates two identifiers:
A file identifier: to identify the file; and
A version Identifier: to identify the version of the file.
For example, if the user uploaded a file testfile.docx, then the Hybrid Cloud Cache will generate one identifier (for example: F1) to identify the file testfile.docx and another identifier to identify the version of the file (for example: V1);
If the user makes a change to testfile.docx and uploads the file again, then the Hybrid Cloud Cache will generate another identifier, V2 to identify the second version of the file. However, the file identifier will remain the same (i.e., F1);
In some embodiments, the two identifiers can be used together can identify any file in the Hybrid Cloud Cache. For example, (F1, V2) would identify version 2 of the file testfile.docx, and (F1, V1) would identify version 1 of the same file;
When an upload operation is received from the user, the system starts attempting to upload the corresponding file(s) to a staging area in the cloud;
If there are multiple upload operations from the user(s), they may be able to be uploaded concurrently to the staging area in the cloud;
The system maintains status information for each file (using a mapping and the two identifiers) being uploaded to the staging area;
When the cache's transaction processing subsystem is ready to execute the upload-transaction, the system logic checks the upload status of the file using the file and version identifiers, and executes the following logic:
If the file is already uploaded to the staging area of the cloud, then the system moves the file from the staging area to the destination where the upload was intended by the user/client. As mentioned herein, this operates to convert the data operation to a metadata operation and maintains the transactional integrity;
If the file is not already uploaded to the staging area, then the logic checks to determine if an upload to the staging area has failed;
If the upload to the staging area has not failed, then the process waits for the upload to the staging area to be completed, followed by transferring the file from the staging area to the destination where the upload was intended by the user/client;
If the upload to the staging area has failed, then the process transfers the file to the destination where the upload was intended by the user/client;
Once the file is transferred or uploaded to the intended destination, a PUSHDONE entry for the upload file transaction is entered into the cache journal. The integrity and consistency provided by the journaling system is preserved as transactions execute and write PUSHDONE records in the journal sequentially.

An important benefit of the system and methods described is that when files are uploaded to the staging area successfully, transaction processing becomes faster because the data operation (that included uploading the file to the cloud) was not done in the context of transaction processing.

Tracking the Status of an Upload

As mentioned, a file in the hybrid cloud cache can be identified by two (typically unique) identifiers, a file identifier, and a version identifier. During execution of an upload file transaction, the cache journaling system (or other process or element executing the described logic) may want to determine if a specific file has been uploaded to the staging area in the cloud. The upload thread which is uploading a file to the staging area is used to provide the status of the upload, the status may be tracked using a hashmap. The structure of such a hashmap may be:
Key: File identifier;
Value: List of [File Version Identifier, Upload Status]. Upload status can have values of UPLOADED, FAILED, and INPROGRESS.

Preliminary Processing of a User/Client Request

When a client uploads a file to the Hybrid Cloud Cache, an entry is added into the hashmap and the upload thread is notified that there is a file to be uploaded to the staging area of the cloud. The journaling system generates a transaction identifier for the upload operation and adds it to the cache journal. For example, if a file (testfile.docx) is uploaded to the hybrid cloud cache by the client, and has a file identifier F1 and a version identifier V1, with an associated transaction T1, then the hashmap would look like:
F1: [File Version id: V1, Upload Status: INPROGRESS], Upload status is INPROGRESS because the upload has not completed or failed yet.

Upload Thread Updates

The upload thread starts uploading the file identified with (F1, V1) to the staging area in the cloud. If the upload thread finished uploading, then it updates the upload status to 'UPLOADED' in the hashmap and notifies the journaling system of the completed upload:
F1: [File Version id: V1, Upload Status: UPLOADED]
If the upload thread was unsuccessful, then the upload status is updated to FAILED and notifies the journaling system about the error upload:
F1: [File Version id: V1, Upload Status: FAILED]

Journaling System Consumes

During execution of transaction T1, which is associated with the upload of a file (F1, V1), the journaling system looks in the hashmap for the upload status:
If the upload status of file (F1, V1) is:
UPLOADED: Rename the file from the staging area in the cloud to the path where the user/client intended to upload;
FAILED: Retry the upload to the area where the user intended to upload;
INPROGRESS: wait for the upload to finish. The journaling system will be notified by the upload thread when it finishes uploading the file (F1, V1) to the staging area in the cloud. Depending on the finished upload status, do one of the two options above;
Write a PUSHDONE record for the upload transaction T1, and remove F1, V1 from the hashmap.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover all adaptations or variations of various embodiments and arrangements of the system and methods described. Combinations of the above arrangements, and other arrangements not specifically described herein, will be apparent to those of skill in the art upon reviewing the above description. Therefore, it is intended that the disclosure not be limited to the particular arrangement(s) or embodiments disclosed, but include all embodiments and arrangements falling within the scope of the appended claims.

The foregoing is provided for purposes of illustrating, explaining, and describing one or more embodiments of the disclosure. Modifications and adaptations to these embodiments will be apparent to those skilled in the art and may be made without departing from the scope or spirit of the invention. Upon reviewing the embodiments, it would be evident to an artisan with ordinary skill in the art that said embodiments can be modified, reduced, or enhanced without departing from the scope and spirit of the claims described below.

What is claimed is:

1. A system, comprising:
    a set of computer-executable instructions; and
    a processor or processors that execute the set of instructions, wherein when executed, the instructions cause the processor or processors to perform operations comprising:
        receiving a request from a client to perform a file upload operation;
        associating the requested operation with a corresponding upload transaction in a journal of a hybrid cloud cache;
        bypassing a transaction processing system of the hybrid cloud cache and attempting to upload the file to a staging area of a cloud system that is part of the hybrid cloud cache;
        determining an upload status of the file when the transaction processing system is ready to execute the upload transaction associated with the file upload operation, wherein
            if the upload status indicates that the file is already uploaded to the staging area of the cloud system, then transferring the file from the staging area to a destination intended by the client;
            if the upload status indicates that the file is not already uploaded to the staging area of the cloud system, then determining if an upload to the staging area has failed, wherein
                if the upload to the staging area has not failed, then waiting for the upload to the staging area to be completed and transferring the file from the staging area to the destination intended by the client;
                if the upload to the staging area has failed, then uploading the file to the destination intended by the client; and
        marking the upload transaction corresponding to the requested operation as having been completed in the journal of the hybrid cloud cache after the file has been transferred to the destination intended by the client.

2. The system of claim 1, wherein the instructions further cause the processor or processors to generate a first identifier to identify the file associated with the upload transaction and a second identifier to identify a version of the file associated with the upload transaction.

3. The system of claim 1, wherein the instructions further cause the processor or processors to discontinue tracking of the upload status of the file once the upload transaction is marked as having been completed in the hybrid cloud journal.

4. The system of claim 1, wherein the instructions further cause the processor or processors to concurrently upload a plurality of files requested to be uploaded by the client.

5. The system of claim 4, wherein the instructions further cause the processor or processors to maintain an upload status for each of the plurality of files.

6. The system of claim 2, wherein the instructions further cause the processor or processors to determine the upload status of the file based on one or more of the first identifier, the second identifier, metadata associated with the first identifier, or metadata associated with the second identifier.

7. The system of claim 1, wherein the instructions further cause the processor or processors to update metadata associated with the file to indicate its location after transferring the file to the destination intended by the client.

8. A method, comprising:
    receiving a request from a client to perform a file upload operation;
    associating the requested operation with a corresponding upload transaction in a journal of a hybrid cloud cache;
    bypassing a transaction processing system of the hybrid cloud cache and attempting to upload the file to a staging area of a cloud system that is part of the hybrid cloud cache;
    determining an upload status of the file when the transaction processing system is ready to execute the upload transaction associated with the file upload operation, wherein
        if the upload status indicates that the file is already uploaded to the staging area of the cloud system, then transferring the file from the staging area to a destination intended by the client;
        if the upload status indicates that the file is not already uploaded to the staging area of the cloud system, then determining if an upload to the staging area has failed, wherein
            if the upload to the staging area has not failed, then waiting for the upload to the staging area to be completed and transferring the file from the staging area to the destination intended by the client;
            if the upload to the staging area has failed, then uploading the file to the destination intended by the client; and
    marking the upload transaction corresponding to the requested operation as having been completed in the journal of the hybrid cloud cache after the file has been transferred to the destination intended by the client.

9. The method of claim 8, further comprising generating a first identifier to identify the file associated with the upload transaction and generating a second identifier to identify a version of the file associated with the upload transaction.

10. The method of claim 9, further comprising determining the upload status of the file based on one or more of the first identifier, the second identifier, metadata associated with the first identifier, or metadata associated with the second identifier.

11. The method of claim 8, further comprising stopping tracking of the upload status of the file once the data operation associated with the upload transaction is marked as having been completed in the hybrid cloud journal.

12. The method of claim 8, further comprising concurrently upload a plurality of files requested to be uploaded by the client.

13. The method of claim 12, further comprising maintaining an upload status for each of the plurality of files.

14. The method of claim 9, further comprising updating metadata associated with the file to indicate its location after transferring the file to the destination intended by the client.

15. A set of computer-executable instructions, which when executed by a processor or processors, cause the processor or processors to perform operations comprising:
    receiving a request from a client to perform a file upload operation;
    associating the requested operation with a corresponding upload transaction in a journal of a hybrid cloud cache;
    bypassing a transaction processing system of the hybrid cloud cache and attempting to upload the file to a staging area of a cloud system that is part of the hybrid cloud cache;
    determining an upload status of the file when the transaction processing system is ready to execute the upload transaction associated with the file upload operation, wherein
        if the upload status indicates that the file is already uploaded to the staging area of the cloud system, then transferring the file from the staging area to a destination intended by the client;
        if the upload status indicates that the file is not already uploaded to the staging area of the cloud system, then determining if an upload to the staging area has failed, wherein
            if the upload to the staging area has not failed, then waiting for the upload to the staging area to be completed and transferring the file from the staging area to the destination intended by the client;
            if the upload to the staging area has failed, then uploading the file to the destination intended by the client; and
    marking the upload transaction corresponding to the requested operation as having been completed in the journal of the hybrid cloud cache after the file has been transferred to the destination intended by the client.

16. The set of computer-executable instructions of claim 15, further comprising instructions that cause the processor or processors to generate a first identifier to identify the file associated with the upload transaction and generate a second identifier to identify a version of the file associated with the upload transaction.

17. The set of computer-executable instructions of claim 16, further comprising instructions that cause the processor or processors to determine the upload status of the file based on one or more of the first identifier, the second identifier, metadata associated with the first identifier, or metadata associated with the second identifier.

18. The set of computer-executable instructions of claim 15, further comprising instructions that cause the processor or processors to concurrently upload a plurality of files requested to be uploaded by the client.

19. The set of computer-executable instructions of claim 18, further comprising instructions that cause the processor or processors to maintain an upload status for each of the plurality of files.

20. The set of computer-executable instructions of claim 15, further comprising instructions that cause the processor or processors to update metadata associated with the file to indicate its location after transferring the file to the destination intended by the client.

\* \* \* \* \*